(12) United States Patent
Symes et al.

(10) Patent No.: US 8,959,304 B2
(45) Date of Patent: Feb. 17, 2015

(54) MANAGEMENT OF DATA PROCESSING SECURITY IN A SECONDARY PROCESSOR

(71) Applicant: ARM Limited, Cambridge (GB)

(72) Inventors: Dominic Hugo Symes, Cambridge (GB); Ola Hugosson, Lund (SE); Donald Felton, Ely (GB); Sean Tristram Ellis, Farnham (GB)

(73) Assignee: ARM Limited, Cambridge (GB)

( * ) Notice: Subject to any disclaimer, the term of this patent is extended or adjusted under 35 U.S.C. 154(b) by 146 days.

(21) Appl. No.: 13/777,338

(22) Filed: Feb. 26, 2013

(65) Prior Publication Data

US 2013/0275701 A1  Oct. 17, 2013

(30) Foreign Application Priority Data

Apr. 17, 2012 (GB) .................................. 1206759.1

(51) Int. Cl.
*G06F 12/00* (2006.01)
*G06F 12/14* (2006.01)

(52) U.S. Cl.
CPC .................................. *G06F 12/145* (2013.01)
USPC ........... 711/163; 711/154; 711/170; 711/203; 711/206; 710/22; 710/28; 710/39; 710/56; 710/120; 710/308; 712/14; 712/36; 712/201; 712/225; 713/151; 713/155; 713/161; 713/166

(58) Field of Classification Search
USPC ........ 711/154, 163, 170, 203; 710/22, 28, 39, 710/56, 120, 308; 712/14, 36, 201, 225; 713/151, 155, 161, 166
See application file for complete search history.

(56) References Cited

U.S. PATENT DOCUMENTS

| | | | |
|---|---|---|---|
| 7,130,977 B1 | 10/2006 | Christie et al. | |
| 7,849,310 B2 | 12/2010 | Watt et al. | |
| 2005/0246502 A1 | 11/2005 | Joshi et al. | |
| 2008/0128494 A1* | 6/2008 | Harris et al. .................. | 235/380 |
| 2011/0208935 A1 | 8/2011 | Grisenthwaite | |
| 2013/0159664 A1* | 6/2013 | Blinzer et al. ................ | 711/207 |

FOREIGN PATENT DOCUMENTS

GB    2 242 926    8/2006

OTHER PUBLICATIONS

Search Report for GB1206759.1, dated Jul. 31, 2012.

* cited by examiner

*Primary Examiner* — Reba I Elmore
(74) *Attorney, Agent, or Firm* — Nixon & Vanderhye P.C.

(57) ABSTRACT

A data processing apparatus comprises a primary processor, a secondary processor configured to perform secure data processing operations and non-secure data processing operations and a memory configured to store secure data used by the secondary processor when performing the secure data processing operations and configured to store non-secure data used by the secondary processor when performing the non-secure data processing operations, wherein the secure data cannot be accessed by the non-secure data processing operations, wherein the secondary processor comprises a memory management unit configured to administer accesses to the memory from the secondary processor, the memory management unit configured to perform translations between virtual memory addresses used by the secondary processor and physical memory addresses used by the memory, wherein the translations are configured in dependence on a page table base address, the page table base address identifying a storage location in the memory of a set of descriptors defining the translations, wherein the page table base address is defined by the primary processor and cannot be amended by the secondary processor.

25 Claims, 11 Drawing Sheets

LSIDENTRY PARAMETERS

| # CORES | S ONLY |
|---|---|
| MMUCTRL (PTBA) | S ONLY |
| NS | S ONLY |
| FLUSH | S ONLY |
| TERMINATE | S ONLY |
| IRQ | NS ALLOWED |
| IRQACK | NS ALLOWED |
| ... | ... |

FIG. 9

MANAGEMENT OF DATA PROCESSING SECURITY IN A SECONDARY PROCESSOR

This application claims priority to GB Application No. 1206759.1 filed Apr. 17, 2012, the entire contents of which are incorporated herein by reference.

FIELD OF THE INVENTION

The present invention relates to data processing apparatuses comprising a primary processor and a secondary processor. More particularly the present invention relates to such data processing apparatuses in which the secondary processor is configured to perform secure data processing operations and non-secure data processing operations on behalf of the primary processor.

BACKGROUND OF THE INVENTION

It is known to provide a data processing apparatus having a primary processor in overall control of the data processing apparatus and a secondary processor configured to perform data processing operations delegated to it by the primary processor. For example, in a data processing apparatus which is required to perform video decoding operations, a primary processor (e.g. a general purpose CPU) may delegate much of the video decoding operations to a dedicated video processing unit (i.e. the secondary processor).

Data security is further known to be an important consideration when configuring a contemporary data processing apparatus. For example, it is known to categorise some data as secure and other data as non-secure, whereby the secure data is only allowed to be accessed by components of the data processing apparatus which are trusted (i.e. secure). Accordingly, a general purpose processor (such as the above mentioned CPU) may be configured to have a secure domain and a non-secure domain, wherein only components which reside in the secure domain of the processor are allowed to access secure data in memory. For example, the TrustZone® technology developed by ARM Limited of Cambridge, UK provides mechanisms for enforcing such security boundaries in a data processing apparatus (as described for example in U.S. Pat. No. 7,849,310, the entire contents of which are incorporated herein by reference).

However, in the context of a data processing apparatus comprising a primary processor and a secondary processor, whilst the primary processor may be configured in this way (i.e. sub-divided into a secure domain and a non-secure domain), it may not be appropriate or even possible to simply extend these secure and non-secure domains to include the secondary processor. In general, the secure domain of a processor represents a relatively smaller portion of a processor than its non-secure counterpart, due to the need for all elements of the secure domain to be strictly checked and verified as trusted in order to enforce the reliability of the secure domain. Extending the secure domain to encompass elements of the secondary processor represents a potential vulnerability to the reliability of this security setup. Furthermore, extending this trusted division into secure and non-secure to the secondary processor would require an appropriate operating system to be run on the secondary processor to support it which may not be feasible when the secondary processor is a dedicated device such as a VPU.

Accordingly, it would be desirable to provide a technique which enabled the secondary processor reliably to perform both secure and non-secure data processing operations on behalf of the primary processor without jeopardising the security of the data processing apparatus.

SUMMARY OF THE INVENTION

Viewed from a first aspect, the present invention provides a data processing apparatus comprising: a primary processor; a secondary processor configured to perform secure data processing operations and non-secure data processing operations; and a memory configured to store secure data used by said secondary processor when performing said secure data processing operations and configured to store non-secure data used by said secondary processor when performing said non-secure data processing operations, wherein said secure data cannot be accessed by said non-secure data processing operations, wherein said secondary processor comprises a memory management unit configured to administer accesses to said memory from said secondary processor, said memory management unit configured to perform translations between virtual memory addresses used by said secondary processor and physical memory addresses used by said memory, wherein said translations are configured in dependence on a page table base address, said page table base address identifying a storage location in said memory of a set of descriptors defining said translations, wherein said page table base address is defined by said primary processor and cannot be amended by said secondary processor.

When the secondary processor is provided for the purpose of carrying out particular tasks (e.g. video decoding) delegated to it but the primary processor, it could represent a security vulnerability in the system if the secondary processor (even when performing secure data processing operations) is simply given unlimited access to all secure data stored in the memory. For example, when the secondary processor is a video processing unit which is required to decode both secure and non-secure streams of video data (for example the secure streams being those which are received in an encrypted state and to which access of the decrypted frames should be restricted), whilst the video processing unit needs access to some secure areas of memory in which it can store data relating to decoding this secure video stream, there remain secure areas of memory to which access by the video processing unit should not be allowed. One example of this could be the area of the secure memory in which decryption keys use to decrypt an encrypted video stream are stored, to which only the primary processor (i.e. the CPU) should be allowed to have access.

In order to reliably extend the secure data processing capability to the secondary processor without giving it access to secure data to which the primary processor may itself need access, it would be possible to configure the secondary processor as an entirely secure device, but this would enable the secondary processor to access all secure data in memory (for example including the above-mentioned encryption keys) and would also not provide the desired separation of secure data processing operations and non-secure data processing operations (for example in the context of a video processing unit, keeping secure and non-secure video streams, decoded using the same VPU, strictly separated from one another). Alternatively, the secure data processing operations could be brought back into the primary processor but this loses the advantage of delegating these specified tasks to the secondary processor.

Hence the present invention provides a secondary processor which is configured to perform both secure and non-secure data processing operations on behalf of the primary processor. Data used in these data processing operations is stored in a memory which is configured to store this data in such a fashion that data classified as secure cannot be accessed by the non-secure data processing operations. For example, the enforcement of this security policy may be provided by a memory (and interconnect buses and so on) configured in accordance with the above-mentioned Trust-Zone® technology provided by ARM Limited, Cambridge, UK. The secondary processor has a memory management unit which administers accesses to the memory from the secondary processor, in particular translating virtual memory addresses used by the secondary processor (i.e. logical addresses used within program code executed by the secondary processor) into physical memory addresses used by the memory (i.e. denoting actual storage locations within the memory). These translations depend on a page table base address which identifies the storage location in the memory of the corresponding page tables and descriptors defining these translations. Only the primary processor can define this page table base address, and in particular (most significantly) the secondary processor itself cannot amend the page table base address. Given that the page table base address determines the translation between virtual memory addresses used in the secondary processor and the physical memory addresses in the memory, this page table base address dictates the view of memory which the secondary processor has.

Accordingly, by appropriately defining the base table page address, the primary processor can ensure that even if the secondary processor is performing secure data processing operations, the view (and indeed accessibility) which the secondary processor has to secure data in the memory is dependent on the page table base address provided to it by the primary processor and hence the primary processor is able to prevent the secondary processor from accessing certain areas of secure memory. Advantageously, this means that both secure and non-secure data processing operations can be delegated to the secondary processor by the primary processor, without the primary processor having to allow the secondary processor unlimited access to the secure data in memory when this secondary processor is performing secure data processing operations.

The page table base address could be provided in a variety of ways, but in one embodiment, said page table base address is stored in a page table base address register in said memory management unit. This provides the memory management unit with a readily accessible mechanism for determining the currently applicable page table base address and provides the primary processor a writeable target to amend the page table base address when required. Furthermore access to the page table base address register can then be controlled by hardware mechanisms such as not providing a bus interface to this register from the secondary processor.

In one embodiment, said primary processor is configured to perform secure data processing operations and non-secure data processing operations, wherein said secure data processing operations are performed in a secure domain of said primary processor and said non-secure data processing operations are performed in a non-secure domain of said primary processor. Whilst it could be the case that the primary processor (as the overall master of the data processing apparatus) could be entirely configured as a secure component, it may not in fact be necessary for the entirety of the primary processor to operate in this secure manner and the primary processor may perform its secure data processing operations in a secure domain and its non-secure data processing operations in a non-secure domain. Due to the need for absolute reliability of the secure domain in order to enforce the division between the secure and non-secure worlds, it is advantageous if data processing operations of the primary processor which do not need to be secure are carried out in a non-secure domain since the level of verification required for such a non-secure domain is considerably lower than that of the secure domain.

In one such embodiment, said page table base address and said set of descriptors are defined by a secure component executing in said secure domain of said primary processor. By configuring them such that the page table base address and the set of descriptors are defined by this secure component, the trust and security associated with the secure domain of the primary processor can be extended into the secondary processor, in particular into its memory access capabilities, without having to extend the secure domain to encompass the secondary processor. This secure component could take a number of forms, for example in one embodiment said secure component is a secure driver executing in said secure domain of said primary processor. A secure driver represents a component of the secure domain which has a trusted security, since only drivers which have been verified to behave in accordance with the security protocol policing the separation between the secure and non-secure domains is allowed to be run as a driver within the secure domain. Equally, in another embodiment said secure component is a secure kernel executing in said secure domain of said primary processor. The secure kernel represents the trusted heart of the operating system running on the primary processor and therefore represents a trusted component which inherently can be relied upon to correctly administer the page table base address and set of descriptors without violating the security policy.

In one embodiment, said secure data processing operations and non-secure data processing operations in said secondary processor are dependent on data processing instructions stored at least partially in said memory. When these data processing instructions are stored at least partially in the memory, this represents a situation in which the security policy dictating which areas of memory the secondary processor can access must be particularly carefully administered, since corruption of these instructions could represent an opportunity to cause the secondary processor to behave in a manner in which the system designer did not intend, in particular in terms of violation of the security policy. To take one example, in the context of a secondary processor which is a video processing unit, the firmware which configures the operation of the video processing unit may well be too large to be stored within the video processing unit itself and therefore needs to be stored in memory. The storage of this firmware in memory could represent a security vulnerability, but the techniques of the present invention can ensure that those parts of this firmware which must remain secure are indeed stored in secure areas of the memory and are not accessible to non-secure data processing operations being carried out on the secondary processor. Furthermore, in the context of a video processing unit, the present techniques enable this firmware to be stored in a secure area of memory dedicated to the video processing unit, without allowing access to a secure area of memory reserved for the primary processor (i.e. CPU). Hence even if the firmware were to be compromised, only the secure video data would be compromised and not other secure data held on behalf of the CPU (such as decryption keys). The secondary processor might comprise only a single processor core, but in one embodiment said secondary processor comprises multiple processor cores. A secondary processor comprising multiple processor cores represents a device in which the present techniques are of particular benefit, because each of the processor cores carries out its own data processing operations therefore whilst one processor core may be performing non-secure data processing operations another processor core may be carrying out secure data processing operations. The present techniques provide that these processor cores can operate at different security levels without the non-secure data processing operations presenting a security risk.

In one embodiment, at least one processor core of said multiple processor cores is configured to execute multiple data processing operations concurrently, wherein said multiple data processing operations comprise at least one secure data processing operation and at least one non-secure data processing operation. Accordingly a single processor core may be required to handle both secure and non-secure data processing operations at the same time without compromising the security of the secure data processing operation. For example, these data processing operations could comprise separate processing threads generated from a single data processing task allocated to this processor core, or they could comprise separate data processing tasks allocated to this core, the processing of which the core is interleaving.

In one embodiment, each processor core of said multiple processor cores comprises a dedicated memory management unit configured to administer accesses to said memory from that processor core and each dedicated memory management unit is configured to store a specified page table base address associated with that dedicated memory management unit. Hence, in this embodiment each of the processor cores has its own memory management unit and each memory management unit stores a page table base address. This page table base address could be a different page table base address for each memory management unit, or, due to the fact that different processor cores may share a given memory space, the same page table base address may be stored in two or more memory management units.

Accordingly in one such embodiment, at least two of said multiple processor cores may be configured to perform at least two data processing operations which share said page table base address. These two data processing operations could therefore be related to two distinct data processing tasks allocated to these processor cores, wherein those two data processing tasks share a given memory address space (defined by the shared page table base address) or alternatively two data processing operations could be separate aspects of a single data processing task which has been allocated to these at least two processor cores. For example, in the context a multi-core video processor unit decoding video streams, the decoding of a given video stream may be shared between two or more of the processor cores and it is appropriate in that context for the multiple processor cores to share a single memory address space.

In another embodiment, said memory management unit is configured to administer accesses to said memory for each processor core of said multiple processor cores and stores a dedicated page table base address associated with each processor core. Thus, a single memory management unit may act as a master memory management unit for multiple processor cores and within that master memory management unit there may be stored a specific page table address for each processor core (although it is also possible for the same page table address to be stored for more than one processor core when these are currently sharing an address space).

In one embodiment, said memory management unit is configured to administer accesses to said memory for each processor core of said multiple processor cores and stores a dedicated page table base address associated with each data processing operation. Accordingly, in this embodiment the "master" memory management unit stores a dedicated page table address on the basis of data processing operations rather than processor cores, for example associating a particular page table address with a given thread or job being handled by a particular processor core.

In one embodiment, each processor core has an associated local storage device configured to store copies of address translations recently performed by said memory management unit for that processor core. When a master memory management unit is provided for multiple processor cores it may be advantageous to provide each processor core with an associated local storage device (for example a micro translation look aside buffer) such that temporal locality inherent to the data processing operations being carried out by a particular core can be taken advantage of and this local storage device can reduce the need for the master memory management unit to update the translation information that it holds so frequently.

In one embodiment, said secondary processor further comprises a bus interface via which said page table base address and said set of descriptors can be defined by said primary processor, wherein said multiple processor cores cannot write to said bus interface. The provision of a bus interface which the multiple processor cores cannot write to provides a hardware enforcement of the limited access to the page table base address and accordingly even if rogue software is executed within the secondary processor, the security of the page table base address is maintained because of the hardware enforcement of the access to this bus interface.

In one embodiment, said secondary processor further comprises a scheduling unit configured to allocate said secure data processing operations and said non-secure data processing operations as jobs between said multiple processor cores. This enables the multiple processor cores to be efficiently used by allocating the data processing operations which needs to be carried out in the secondary processor as jobs which can be scheduled in this fashion.

In one embodiment, said scheduling unit comprises a memory space allocation table, said memory space allocation table configured to store a set of entries each indicating a page table base address and a security status, wherein said scheduling unit is configured to allocate memory to said jobs executing on said multiple processor cores on the basis of said set of entries in said memory space allocation table, wherein only said secure component can write an entry in said set of entries with a secure security status. Hence, by means of the configuration that only a secure component within the secure domain of the primary processor is able to label an entry in the memory space allocation table as having a secure security status, the trust associated with the secure domain of the primary processor can be extended to control which areas of memory the secondary processor can access. Jobs allocated to the multiple processor cores are associated with a particular entry in the memory space allocation table such that this security is passed on to each job executing on each processor core.

In one embodiment, said scheduling unit comprises a job queue configured to determine an execution order of said jobs with reference to said set of entries in said memory space allocation table. Thus entries of the memory space allocation table can be defined without reference to the ordering which those memory spaces will be used and this allows greater flexibility in defining the order in which jobs will be executed by defining this job queue with reference to the entries of the memory space allocation table.

In particular, in one such embodiment a non-secure component executing in said non-secure domain of said primary processor can determine said execution order. The execution order of the jobs which are queued to be distributed to the multiple processor cores is in itself not a security critical issue and therefore complexity of the secure components in the secure domain of the primary processor can be reduced by allowing a non-secure component in the primary processor to administer this execution order. For example, in the context of a secondary processor which is a video processing unit, the order of job execution could be determined by a non-secure video driver executing in a non-secure domain of the primary processor, removing the need for this task to be performed by a component in the secure domain of the primary processor and thus enabling the secure domain to be smaller, simpler and thus easier to maintain as a trusted portion of the system as a whole.

In one embodiment, said secondary processor is a video processing unit configured to perform video coding operations. Hence these video coding operations, which may for example be video decoding operations, can be subject to the secure/non-secure division between data processing operations supported by the present techniques and hence the video processing unit can handle both secure video streams (for example encrypted video streams to which access should be restricted) and non-secure video streams (to which access is freely allowed).

In one embodiment, said video processing unit comprises multiple video cores, said multiple video cores configured to perform said video coding operations in parallel on multiple streams of video data. Accordingly, separate video cores can in parallel perform video coding operations (for example video decoding operations) in parallel on multiple streams of video data, even though those video streams may comprise a mix of secure and non-secure video streams.

In one embodiment, said video processing unit comprises multiple video cores, said multiple video cores configured to perform said video coding operations in parallel on a single stream of video data, wherein said multiple video cores share said page table base address. Thus a single stream of video data may be handled in parallel by multiple video cores, these multiple video cores then sharing a page table base address, i.e. a common memory space.

In one embodiment, said secondary processor is a graphics processing unit configured to perform graphics processing operations. A graphics processing unit may also particularly benefit from the present techniques because a graphics processing unit typically executes a number of processing threads and the present technique enables these processing threads to be a mix of secure threads and non-secure threads without jeopardising the security of the system.

Viewed from a second aspect the present invention provides a data processing apparatus comprising: primary processor means; secondary processor means for performing secure data processing operations and non-secure data processing operations; and memory means for storing secure data used by said secondary processor means when performing said secure data processing operations and for storing non-secure data used by said secondary processor means when performing said non-secure data processing operations, wherein said secure data cannot be accessed by said non-secure data processing operations, wherein said secondary processor means comprises memory management means for administering accesses to said memory from said secondary processor means, said memory management means for performing translations between virtual memory addresses used by said secondary processor means and physical memory addresses used by said memory means, wherein said translations are configured in dependence on a page table base address, said page table base address identifying a storage location in said memory means of a set of descriptors defining said translations, wherein said page table base address is defined by said primary processor means and cannot be amended by said secondary processor.

Viewed from a third aspect, the present invention provides a method of data processing in a data processing apparatus comprising a primary processor and a secondary processor, the method comprising the steps of: performing secure data processing operations and non-secure data processing operations in said secondary processor; storing in a memory secure data used by said secondary processor when performing said secure data processing operations and storing non-secure data used by said secondary processor when performing said non-secure data processing operations, wherein said secure data cannot be accessed by said non-secure data processing operations; administering accesses to said memory from said secondary processor in a memory management unit in said secondary processor by performing translations between virtual memory addresses used by said secondary processor and physical memory addresses used by said memory; and configuring said translations in dependence on a page table base address, said page table base address identifying a storage location in said memory of a set of descriptors defining said translations, wherein said page table base address is defined by said primary processor and cannot be amended by said secondary processor.

The above, and other objects, features and advantages of this invention will be apparent from the following detailed description of illustrative embodiments which is to be read in connection with the accompanying drawings.

BRIEF DESCRIPTION OF THE DRAWINGS

The present invention will be described further, by way of example only, with reference to embodiments thereof as illustrated in the accompanying drawings, in which:

FIG. 9 schematically illustrates various task definition parameters for a secure task and their accessibility by secure and non-secure components in a task definition table in one embodiment;

DESCRIPTION OF EMBODIMENTS

Figure 1:
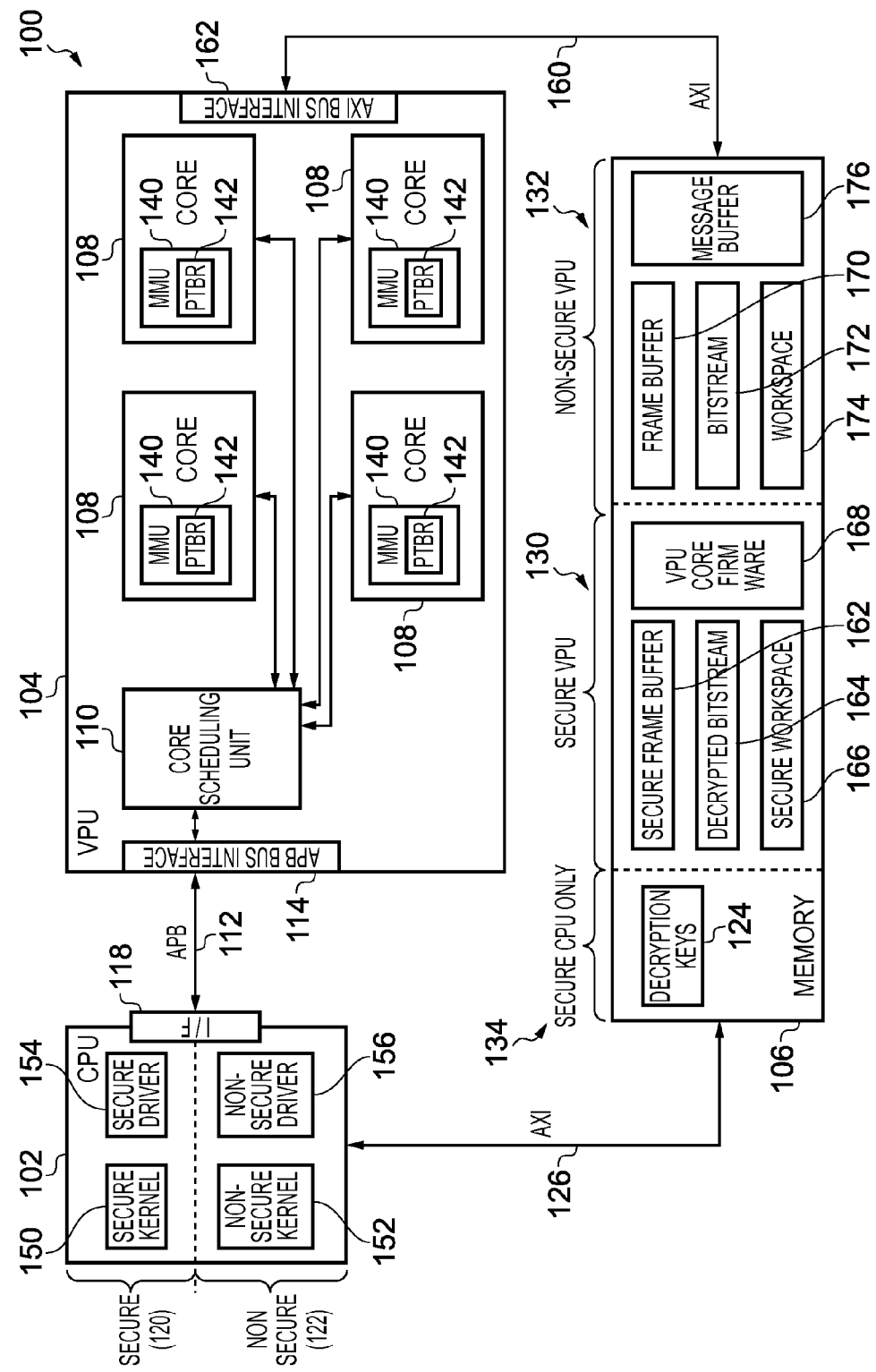
FIG. 1 schematically illustrates a data processing apparatus in one embodiment in which a video processing unit is provided to perform video coding operations on behalf of a general purpose CPU.

FIG. 1 schematically illustrates a data processing apparatus in one embodiment. This data processing apparatus 100 comprises a central processing unit (CPU) 102, a video processing unit (VPU) 104 and an external memory 106. The CPU 102 is a general purpose processing device, but the VPU 104 is specifically configured to efficiently perform video coding tasks. In particular, the CPU 102 and VPU 104 are configured such that the CPU 102 is the primary or master device in the data processing apparatus 100 whilst the VPU 104 is configured as a secondary or slave device which operates under the overall control of the CPU 102. Accordingly, when the CPU 102 determines that there is a video coding (i.e. encoding or decoding) task to be carried out it delegates this task to the VPU 104 which carries it out on behalf of the CPU 102.

In more detail, the VPU 104 has four processor cores 108 provided for the dedicated execution of video processing tasks. The distribution of video processing tasks to the video cores 108 is administered by the core scheduling unit 110. This core scheduling unit 110 in turn receives delegated task definitions from the CPU 102 over the APB 112. This APB 112 is an AXI Peripheral Bus (as provided by ARM Limited, Cambridge, UK). The APB 112 connects to the VPU 104 via the interfaces 114 and 118.

The CPU 102 is subdivided into a secure domain 120 and a non-secure domain 122. This subdivision of the CPU 102 into secure and non-secure domains may for example be provided in accordance with the TrustZone technology provided by ARM Limited of Cambridge, United Kingdom as described for example in U.S. Pat. No. 7,849,310, the entire contents of which are incorporated herein by reference. In essence, components within the secure domain 120 are trusted within the data processing apparatus 100, and therefore are allowed access to security-sensitive data within the data processing apparatus 100, whilst components in the non-secure domain 122 are not allowed access to such security-sensitive data. For example, within the memory 106 there may be stored decryption keys 124 which enable encoded data to be decrypted and are therefore examples of such security-sensitive data. The CPU 102 has access to the memory 106 via AXI bus 126 (as also provided by ARM Limited of Cambridge UK). Interfaces to the AXI bus 126 are not illustrated for clarity. In the same manner that the CPU 102 is subdivided into a secure domain 120 and a non-secure domain 122, the memory 106 is sub-divided into regions which may be specified as secure or non-secure. Most importantly, a component operating in the non-secure domain 122 of the CPU 102 cannot access a region of memory 106 which has been specified as secure. The reader is referred to the above mentioned description of the TrustZone® technology in U.S. Pat. No. 7,849,310 for further detail of how such access policing may be configured.

Furthermore, the video processing tasks delegated to the VPU 104 by the CPU 102 are also classified as either secure tasks or non-secure tasks, in dependence on the nature of the task and in particular the nature of the video stream which that task is required to perform video processing operations on. Thus, the VPU 104 is required to perform video processing tasks (in particular in this example embodiment video decoding tasks) on different video streams, some of which may be classified as secure. In this example embodiment a video stream is designated as secure if it is received as an encrypted bitstream and free access to the decrypted bitstream should not be allowed. For this reason, a video core 108 which is performing video processing tasks either performs its video processing tasks making use of a region of 130 of memory 106 which is dedicated to the "secure VPU" or to a region 132 of the memory 106 which is dedicated to the "non-secure VPU". Most importantly therefore a video core 108 which is performing a non-secure video processing task should be prevented from accessing any region of memory which is defined as being secure. However, within the context of secure video processing tasks being carried out within the VPU 104, it would be undesirable to simply give a core 108 executing such a secure video processing task unlimited access to all secure regions of memory 106 because this would for example give that core access to a region of memory 106 such as that labelled 134 in which the decryption keys 124 are stored and should only be accessed by components operating within the secure domain 120 of the CPU 102. This is the case because although a component within the secure domain 120 of the CPU 102 may delegate a secure video processing task to a core 108 of the VPU 104, allowing that core to have full secure domain status, i.e. extending the secure domain 120 of the CPU 102 to include the video core 108 carrying out that secure processing task (at least for the duration thereof), would mean that the VPU 104 would have to run an operating system which is able to enforce the secure/non-secure subdivision in the same manner as is carried out in the CPU 102. However, a dedicated processing device such a VPU 104 typically does not have the facilities to run such an operating system.

The data processing apparatus 100 addresses this problem by enabling the CPU 102 to delegate video processing tasks to the VPU 104 which, as well as configurational parameters for the task, specify a page table base address which is used by a memory management unit (MMU) 140 within each video core 108 to perform translations between the virtual memory addresses used within each core 108 and the physical memory addresses used by the memory 106. Each MMU 140 is provided with one or more page table base registers (PTBR) 142 in which the page table base address for the processing task(s) to be carried out is(are) held.

Within the CPU 102, each of the two security domains 120 and 122 has its own kernel, namely secure kernel 150 and non-secure kernel 152. These kernels represent the core of the operating system running in each domain. In addition, as illustrated in FIG. 1, a driver is executing in each of the respective domains namely secure driver 154 and non-secure driver 156. These drivers are configured to interact with the VPU 104 and to delegate video processing operations thereto. Accordingly, it is the secure driver 154 which determines the page table base address which a video core 108 will have locally stored in the page table base register 142 of its MMU 140 when it carries out a secure video processing task on behalf of the CPU 102. Conversely, when a video core 108 is carrying out a non-secure video processing task on behalf of the CPU 102, either the secure driver 154 or the non-secure driver 156 may have set the page table base address in the respective page table base register 142, since both secure and non-secure parts of the CPU 102 are able to initiate non-secure video processing tasks in a video core 108. Significantly, the page table base address set in the page table base register 142 can only be set by a component running in the CPU 102 and these page table base addresses cannot be set by any firmware running on the VPU 104.

The memory 106 in FIG. 1 is schematically illustrated as being sub-divided into three portions 134, 130 and 132, respectively corresponding to: an area which may only be accessed by a secure component in the CPU; an area designated for use by a video core 108 performing a secure video processing task; and an area designated for use by a video core 108 performing a non-secure video processing task. The restriction of access to regions of memory 106 is enforced by two mechanisms. Firstly, only a video processing task which is designated as secure is able to pass an access request to the memory 106 via the AXI bus 160 and the AXI bus interface 162 (as enforced by the above-mentioned TrustZone® technology). Hence, a non-secure video processing task being carried out by a video core 108 cannot successfully carry out a memory access pertaining to the secure area 130 or 134.

The second mechanism by which control over access to particular regions of memory 106 is exercised is by means of the above mentioned page table base addresses. Since these page table base addresses provide the translation between the virtual memory addresses used within each video core 108 and the physical memory addresses used by the memory 106, appropriate setting of these page table base addresses (and of course the corresponding page tables and descriptors) can further constrain which areas of memory 106 are accessible to a given video core 108 in dependence on the video processing task it is carrying out. Hence, within the secure areas of memory 106, the area 134 can be reserved as an area which is only accessible to secure components operating within the CPU 102, whilst access can be granted to the secure VPU area 130 to secure video processing tasks being carried out by a video core 108. Example items which may be held in the secure VPU memory 130 whilst a secure video processing task is being carried out are the secure frame buffer 162, the decrypted bit stream 164 and the secure workspace 166. Additionally, it may commonly be the case that the firmware provided to configure the operation of the video cores 108 in VPU 104 is too large to be held within VPU 104 and accordingly this VPU core firmware 168 may also be held in the secure VPU memory area 130 (such that it is shielded from non-secure processors being executed by a video core 108). Equivalently, within the non-secure VPU memory area 132, a frame buffer 170, a bit stream 172 and a workspace 174 are examples of items which may be held in the this non-secure memory for use by a video core 108 when performing a non-secure video processing task. Additionally, a message buffer 176 is also held within the non-secure VPU memory area 132, this message buffer being used to provide a communication channel between the video cores 108 and the CPU 102. Being held in non-secure memory, either a secure or a non-secure processing task can access this message buffer to read or write a message as appropriate. Note that although a given video processing task may be carried out as a secure data processing operation, aspects of the administration of the task may nevertheless be handled by the non-secure driver 156 (removing this processing burden from the secure driver 154). For example in the illustrated embodiment, the non-secure driver 156 can manage the rate and progress of the video decode by sending messages to the secure session using message buffer 176. Example messages are "frame complete" or "input buffer empty".

Figure 2:
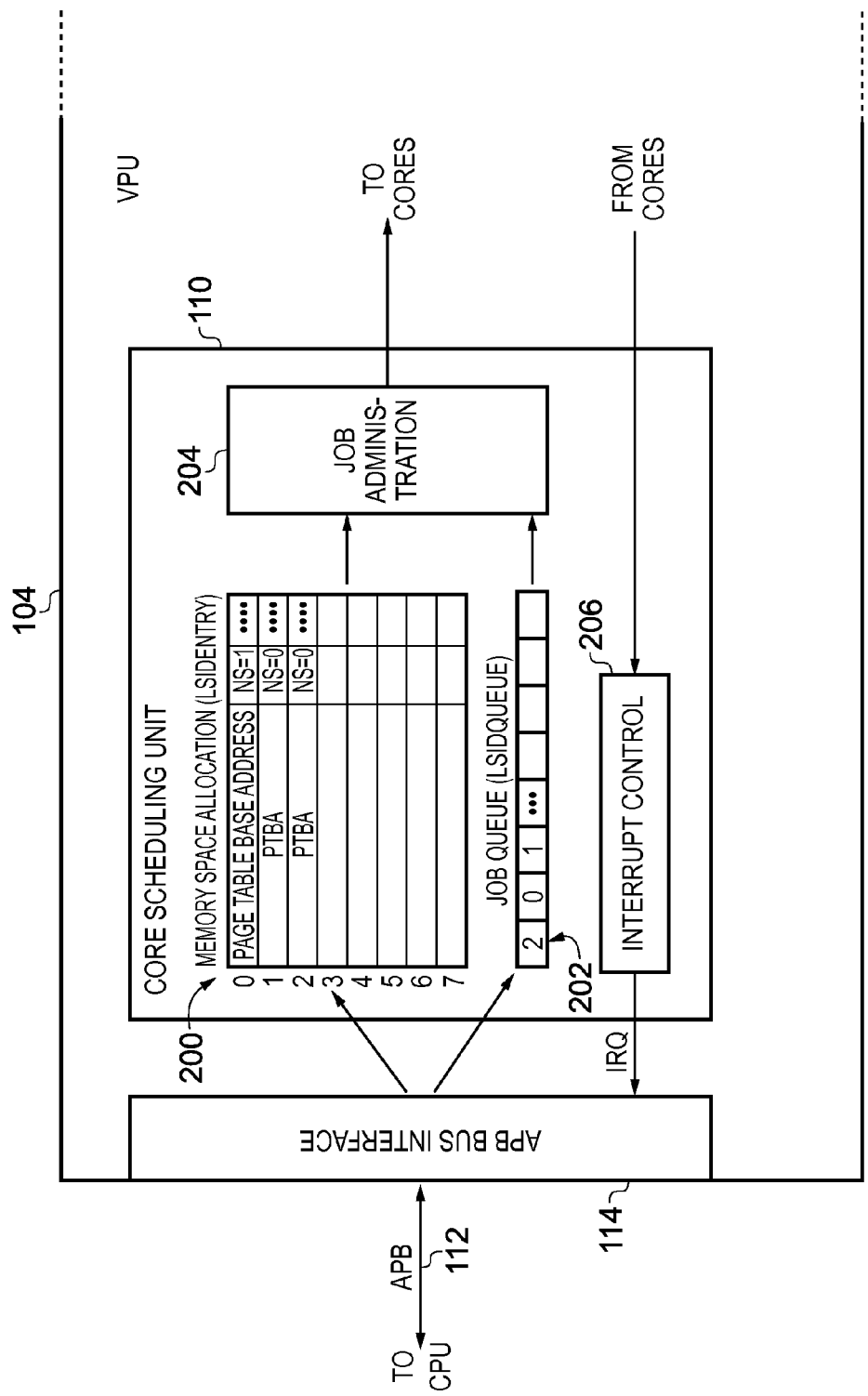
FIG. 2 schematically illustrates in more detail the configuration of the video processing unit of FIG. 1.

FIG. 2 schematically illustrates in more detail the configuration of some components of the video processing unit 104 shown in FIG. 1. In particular, more detail is given of the configuration of the core scheduling unit 110. The APB 112 and interface 114 are as described with reference to FIG. 1. When a driver (whether secure 154 or non-secure 156) running on CPU 102 (bus master) seeks to write a delegated task definition to the VPU 104 (bus slave) this takes place via the APB 112 and the interface 114. Within the VPU 104 the target of this write operation is the core scheduling unit 110. The core scheduling unit 110 comprises a memory space allocation table 200, a job queue 202 and a job administration unit 204, which administers the allocation of video processing tasks to the video cores 108. The configuration details of a given delegated task definition are stored in the memory space allocation table 200, in particular including a page table base address (PTBA) associated with the delegated task and a security bit (NS) defining whether the delegated task is to be carried out as secure task or a non-secure task. Other configuration parameters are also stored, some of which will be discussed in more detail later on in this description. When a delegated task definition is added to an entry of a memory space allocation table 200, an entry can thereafter also made in the job queue 202, indicating the order in which tasks defined in entries of the memory space allocation table should be executed as video cores become available. This updating of the job queue 202 may happen some time after the initial configuration of the memory space allocation table 200. For example, it is typical for the memory space allocation table 200 to be configured once at the start of decoding a video stream and then the job queue is updated while the stream is running (such as on a frame by frame basis). There is no need to add an entry to the job queue at the time the memory space allocation table is configured. The administration of the job queue 202 is handled by the non-secure driver 156, since the particular ordering which the jobs are executed is not security-critical. Accordingly, the job administration unit 204 refers to both the memory space allocation table 200 and the job queue 202 when selecting the next delegated data processing operation to be carried out by one of the video cores 108. A further component of the core scheduling unit 110 is the interrupt control 206 which is configured to receive interrupt signals from the video cores and to issue an interrupt signal (IRQ) to the CPU 102 via the APB 112. Note that there is no bus interface from the video cores to the core scheduler so the registers therein (which form the memory space allocation table 200 and the job queue 202) are only writable by an external bus master, i.e. the CPU 102.

Figure 3:
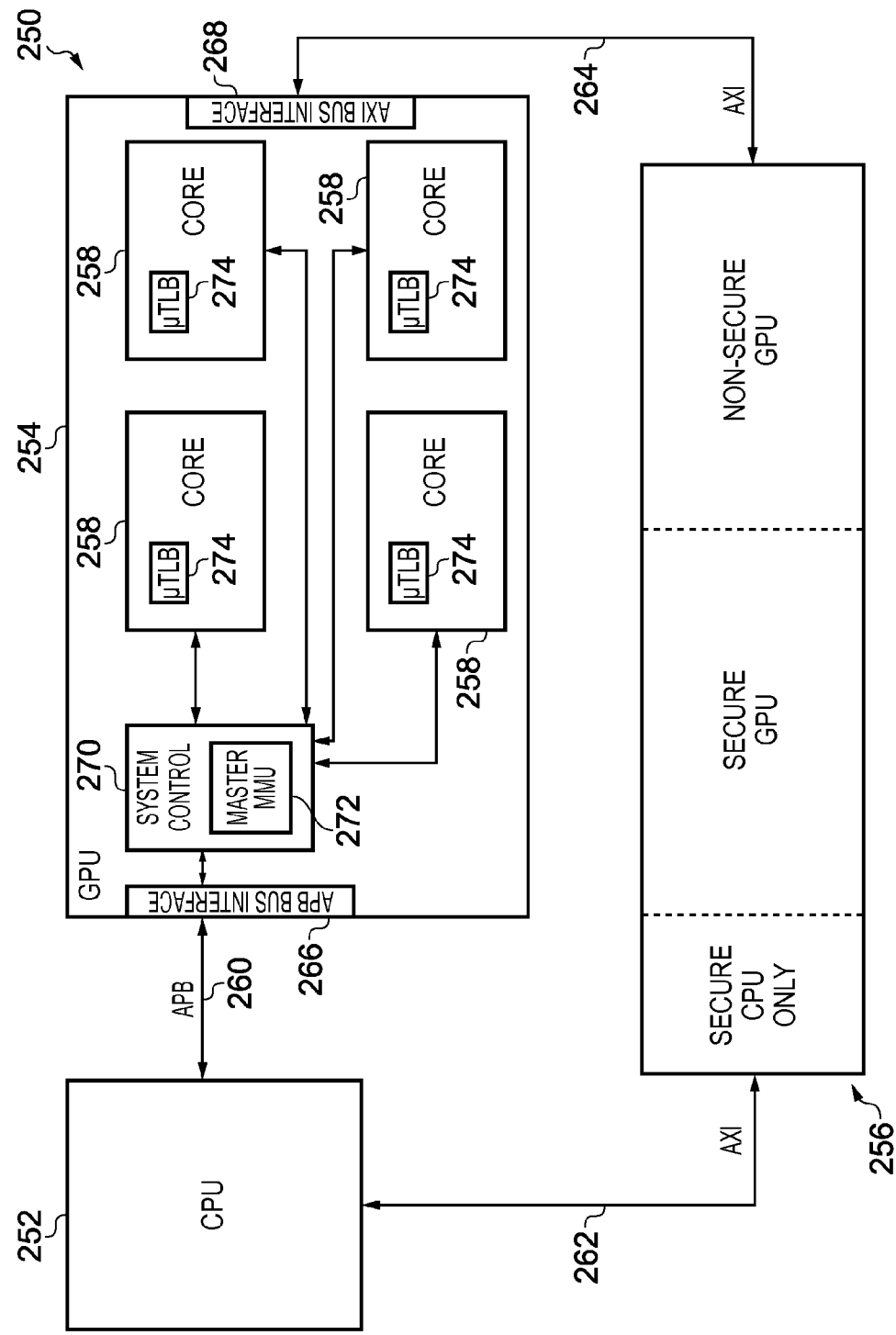
FIG. 3 schematically illustrates a data processing apparatus in one embodiment in which a graphics processing unit is provided to perform graphics processing operations on behalf of a CPU.

FIG. 3 schematically illustrates an alternative embodiment to that illustrated in FIG. 1, wherein the data processing apparatus 250 comprises a CPU 252, a graphics processing unit (GPU) 254 and a memory 256. The CPU 252 is configured in the same way as the CPU 102 in FIG. 1 and is not described further here. Similarly the memory 256 is configured like the memory 106 in FIG. 1, and the buses 260, 262 and 264 and the interfaces 266 and 268 are also configured like their counterparts in FIG. 1. Within the GPU 254, graphics processing cores 258 are provided which carry out graphics processing tasks delegated by the CPU 252.

In the GPU 254, the system control unit 270 plays the role that the core scheduling unit 110 plays in the embodiment illustrated in FIG. 1. One difference to the core scheduling unit 110 is that the system control unit 270 comprises a master MMU 272 which provides a centralised administration of the virtual to physical address translations mentioned above. The master MMU 272 and system control unit 270 are configured to administer the control over which areas of memory 256 are accessible to the tasks being carried out by the graphics processing cores 258 on a thread basis, as will be described in more details with reference to FIG. 4. Because of the centralised master MMU 272, each graphics processor core 258 is provided with a micro-TLB 274, which each provide associated local storage for the relevant graphics processing core 258 to store copies of address translations recently performed by the memory management unit 272 for that processor core.

Figure 4:
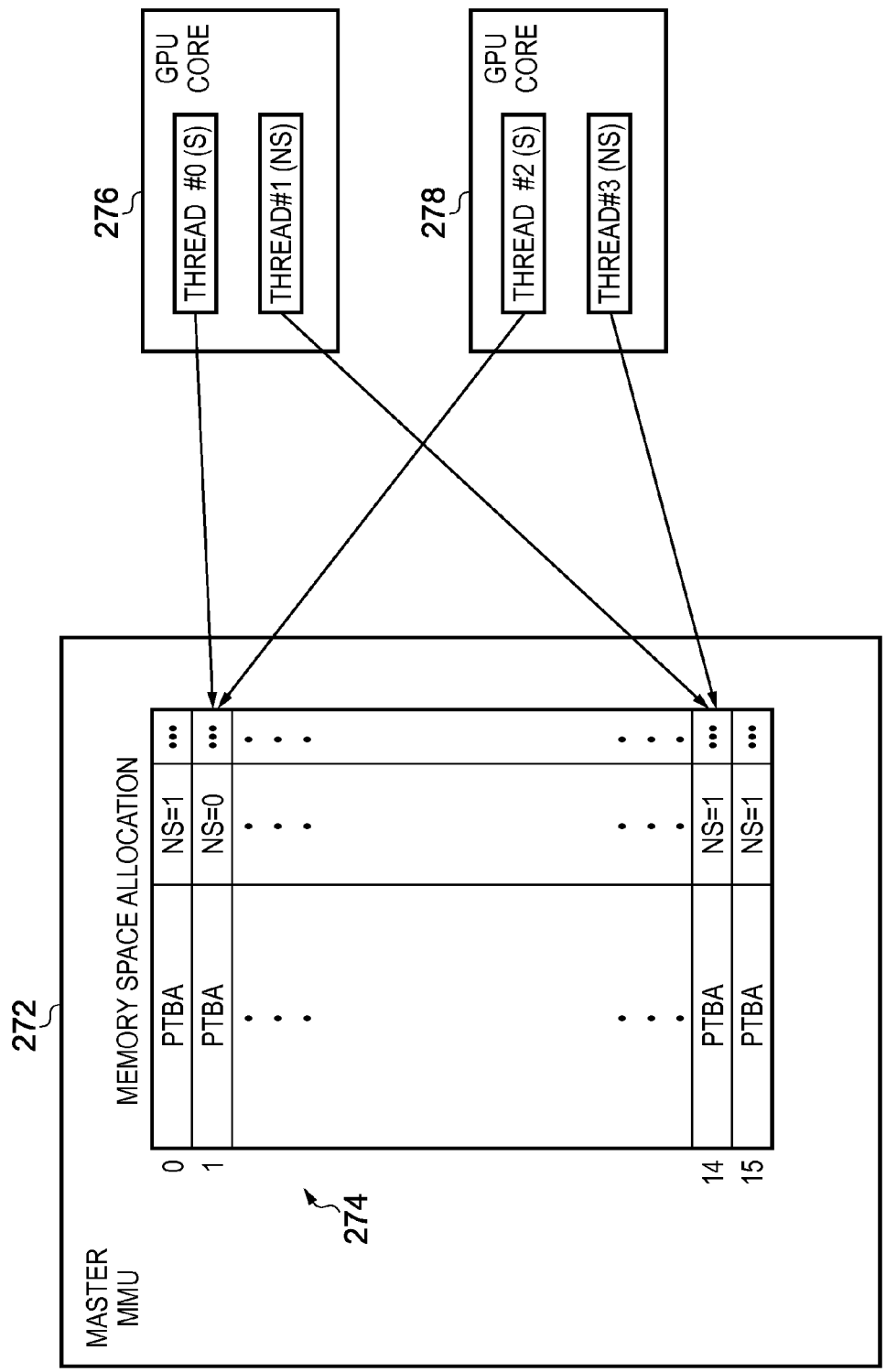
FIG. 4 schematically illustrates in more detail the configuration of the master MMU shown in FIG. 3.

FIG. 4 schematically illustrates in more detail the configuration and operation of the master MMU 272 as shown in FIG. 3. The master MMU 272 and system control unit 270 administer the data processing tasks delegated to the GPU 254 on a thread basis. The master MMU 272 has a memory space allocation table 274 in which the configuration details of up to 16 delegated processing operations can be stored (in accordance with the delegated task definitions received from the CPU 252 over the APB 260). As before in the example of the memory space allocation table 200 within the core scheduling unit 110 in FIG. 2, the memory space allocation table 274 comprises page table base address information and security status information (as well as other configuration details) for each delegated task definition. Each such delegated task definition can be carried out by the generation of one or more threads which may be executed by one or more graphics processing cores. Hence, as illustrated in FIG. 4 the delegated task definition stored in entry 1 of the memory space allocation table 274 is a secure task which is being executed by thread #0 on GPU core 276 and the thread #2 on GPU core 278. Similarly, the delegated task definition that is stored in entry 14 of the memory space allocation table is being executed as thread #1 on GPU core 276 and thread #3 on GPU core 278. Accordingly, it will be appreciated that not only can two separate threads executing on different GPU cores operate with reference to one memory space allocation table entry, but also that within a given GPU core both secure and non-secure threads may execute simultaneously. In this manner, any given thread executing on a GPU core 258 may only access areas of memory 256 in accordance with the address translations provided by master MMU 272 (and possibly cached in micro-TLB 274) on the basis of the corresponding page table base address stored in the memory space allocation table 274.

Figure 5:
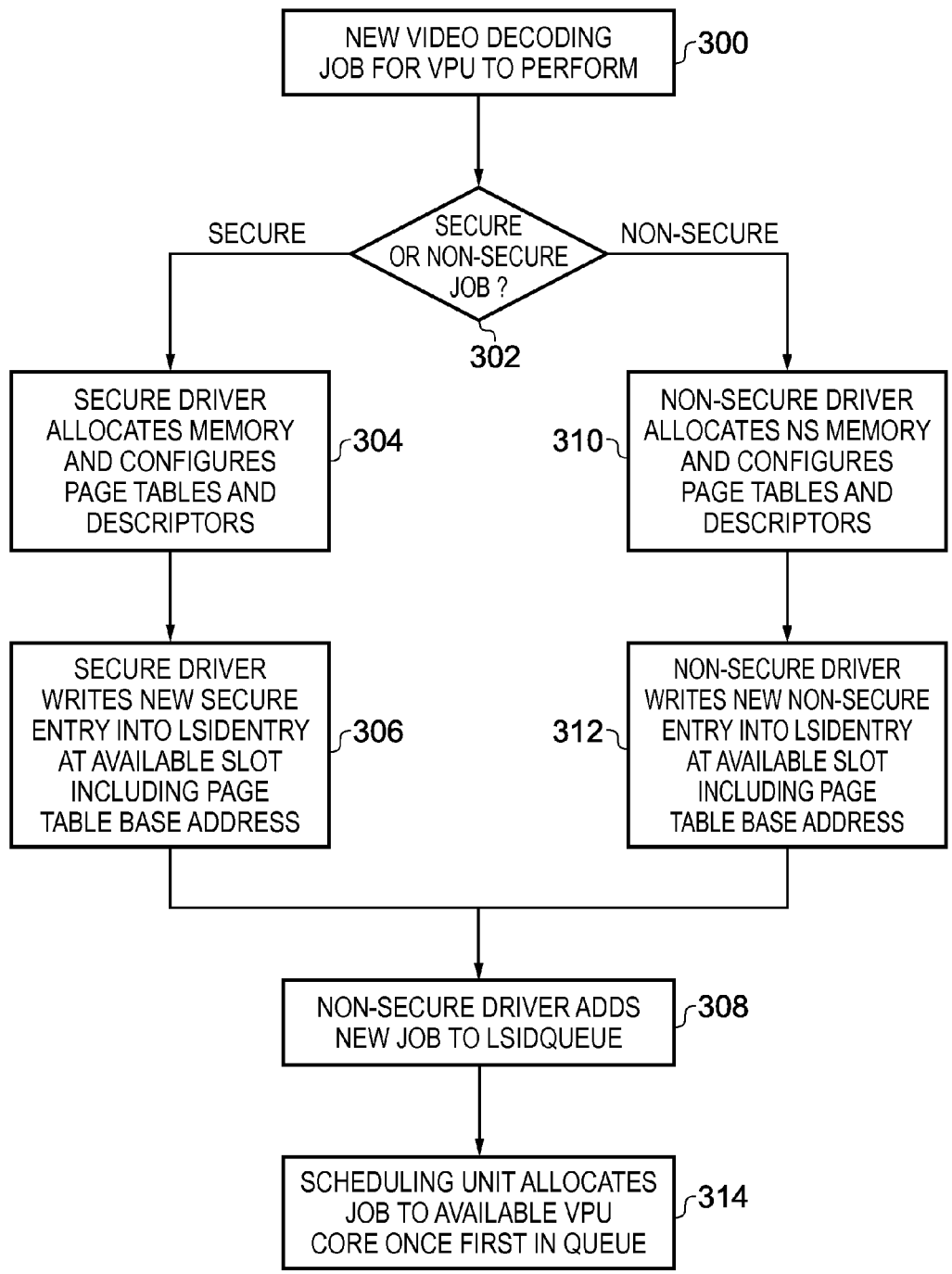
FIG. 5 schematically illustrates a series of steps which may be taken in one embodiment in which a VPU is allocated a video decoding task to perform.

FIG. 5 schematically illustrates a series of steps which are taken in one embodiment in which a VPU (such as that illustrated in FIG. 1) is allocated a video decoding task to perform. The flow begins at step 300 when a new video decoding job exists for the VPU to perform on behalf of the CPU. At step 302 it is determined whether or not this video decoding job (task) should be handled as a secure task or not. Although a non-secure job can safely be handled as a secure job, in general only those tasks which explicitly need to be performed securely will be handled as secure tasks. Furthermore it may be the case that the video input for a non-secure job may come from a non-trusted component which does not have access to secure memory and so it may in any event not be practical to handle a non-secure job as a secure job. In the case of a secure task, the flow proceeds to step 304, wherein it is the secure driver 154 within the CPU 102 which allocates an area of secure memory (i.e. within the section 130 of the memory 106) and the secure driver further configures the page tables and descriptors accordingly to correspond to the allocated memory area. Then at step 306 the secure driver 154 writes a new secure entry into the register LSIDENTRY (i.e. into the memory space allocation table 200) at an available entry slot. This new entry is labelled as secure (NS=0) and includes the page table base address provided by the secure driver at step 304. The flow then proceeds to step 308.

Alternatively, if the new video decoding job to be performed can be handled non-securely then from step 302 the flow proceeds to step 310 whereby it is the non-secure driver 156 in the CPU 102 which allocates an area of non-secure memory to this task and configures the page tables and descriptors pointed to by a suitable page table base address to correspond to this allocated area of memory. Then at step 312 the non-secure driver 156 writes the new non-secure entry into LSIDENTRY (i.e. memory space allocation table 200) at an available slot including the page table base address defined at step 310. The entry is labelled as non-secure (i.e. NS=1). Note that the interface between the CPU 102 and the VPU 104 is such that a non-secure driver 156 cannot set the security status of an entry in the memory space allocation table to be secure. This mechanism described in more detail in the following. The flow then proceeds to step 308.

At step 308 the non-secure driver 156 adds the new job to the job queue 202 (LSIDQUEUE). In other words, the administration of the order in which the delegated video decoding tasks are carried out is administered by the non-secure driver 156, since this burden can be taken away from the secure driver 154 because it is not a security-critical task. Finally, at step 314 the core scheduling unit 110 (in particular by means of the job administration unit 204) allocates this job to an available VPU core 108 once it becomes first in the job queue 202.

Figure 6:
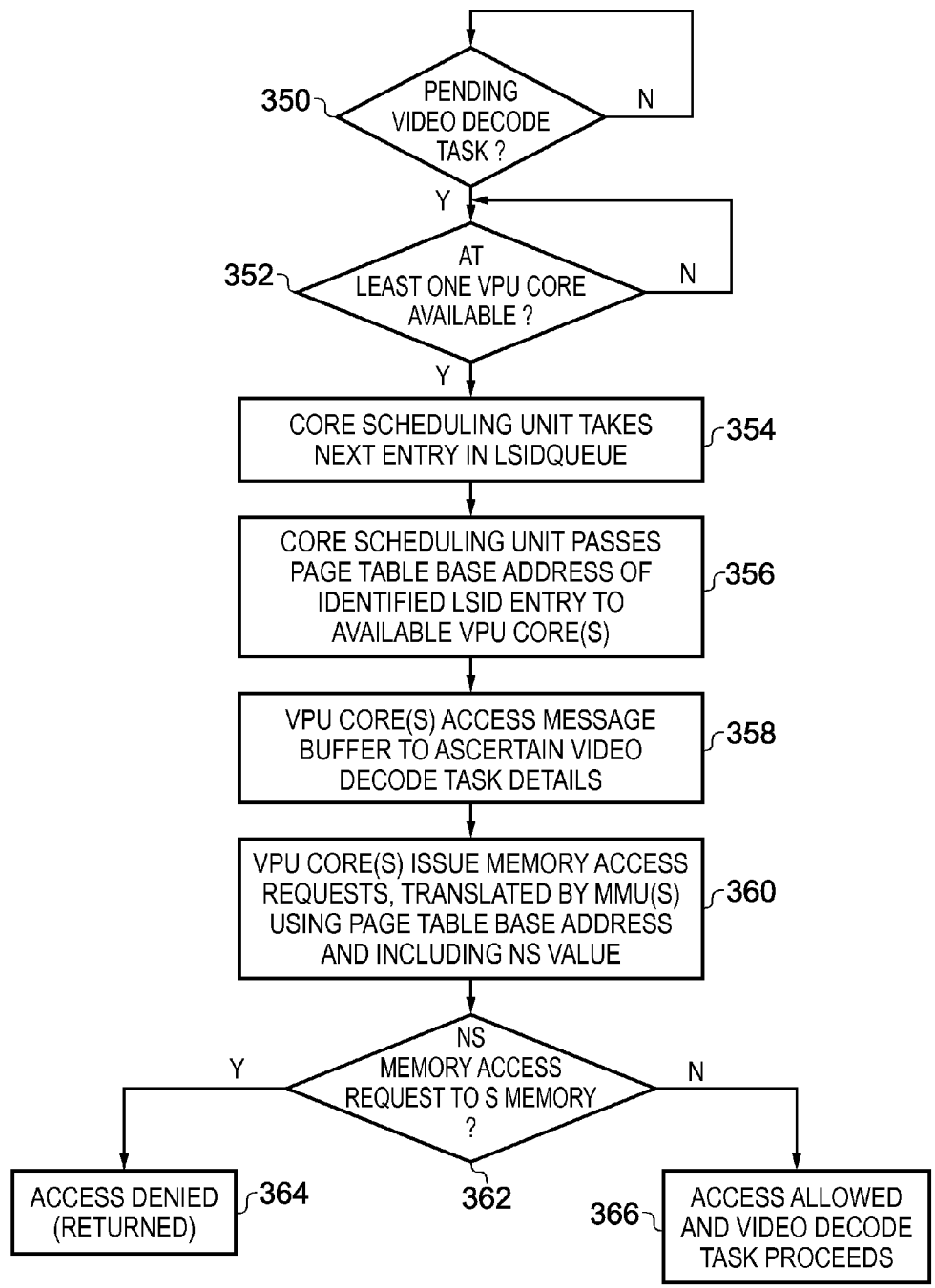
FIG. 6 schematically illustrates a series of steps which may be taken in a VPU in one embodiment.

FIG. 6 schematically illustrates a series of steps taken in a VPU such as that illustrated in FIG. 1 in one embodiment. The flow begins at step 350 where it is determined if there is a pending video decode task to be carried out, i.e. if the job queue 202 indicates an entry in the memory space allocation table 200 which should be handled. Once this is the case the flow proceeds to step 352 where it is determined if there is at least one VPU core 108 available. Once this is the case then the flow proceeds to step 354. Here, the core scheduling unit 110 (specifically, the job administration unit 204) takes the next entry in the job queue (LSIDQUEUE) and at step 356, the core scheduling unit 110 passes the page table base address from the identified LSIDENTRY to the available VPU core (or cores, if the task is to be shared between more than one video core). Then at step 358, the VPU core accesses the message buffer 176 in the non-secure memory area 132 to ascertain further particular details of the video decode task to be carried out (for example the location of the bit stream in memory which is to be decoded). The flow then proceeds to step 360, where the VPU core begins carrying out this decoding task. This involves issuing memory access requests via the interface 162 and the AXI bus 160 to the memory 106, these memory access requests having being translated by the MMU 140 within the video core 108 using the page table base address stored in the relevant page table base register 142. The MMU allows each area of memory to be configured with one of four bus attribute configurations. The bus attribute configurations set policies such as security status and cache-ability. Importantly the bus attribute setting for each memory access requests are necessarily influenced by the NS value defined in the memory space allocation table 200 for this delegated task. One the one hand it is possible for a secure (NS=0) video task to make a non-secure bus access for certain memory areas (such as the message buffer). However, for a non-secure task the bus attribute is forced to be non-secure. The AXI access security, which is the deciding factor in whether a given memory access request is allowed to proceed, is taken from the bus attribute setting rather than the NS bit directly. In this manner, at step 362 it is determined if a non-secure memory access request is being made to a secure area of memory. As mentioned above, this policing of the physical division between the secure and non-secure worlds forms part of the hardware (i.e. bus interface 162 and the AXI bus 160), in this example in accordance with the TrustZone technology provided by ARM Limited, Cambridge, UK. Accordingly, if at step 362 it is determined that a non-secure memory access is seeking to access secure memory then the flow proceeds to step 364 where this access is denied and the memory access request is returned to its issuer. Alternatively, if the determination at step 362 is negative then the flow proceeds to step 366 where the access to memory is allowed and the video decoding task proceeds.

Figure 7:
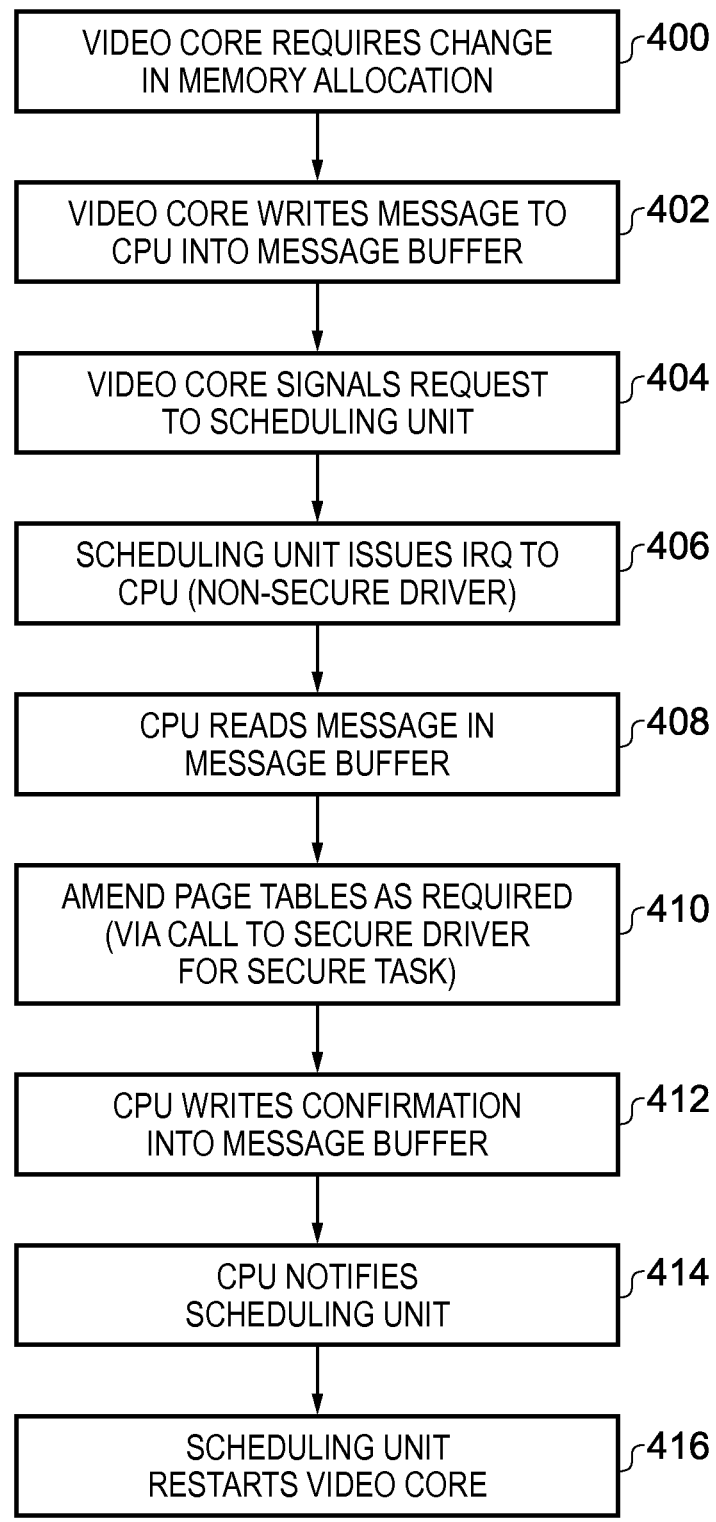
FIG. 7 schematically illustrates a series of steps that may be taken in a data processing apparatus in one embodiment in which two-way communication occurs between a CPU and a video core in a VPU.

FIG. 7 schematically illustrates a series of steps which may be taken in one embodiment, which illustrates how a video core, such as one of the video cores 108 in FIG. 1, may communicate with the CPU 102. One reason why the video core may wish to communicate with the CPU 102 is if it requires a change in the memory allocation provided to it (step 400). For example, it may be the case that an initial memory allocation proves to be insufficient for the video decoding task that the video core 108 is seeking to perform and therefore a larger memory allocation must be requested. Thus, when a video core 108 requires such a change in memory allocation, it stops the video decoding that it is currently performing and the flow proceeds to step 402 where the video core 108 writes a message to the CPU 102 into the message buffer 176 in the non-secure area of memory 132. Then at step 404, the video core 108 signals through the core scheduling unit 110 that it wishes to notify the CPU 102 of this new message, which is to be done via means of an interrupt. Hence, at step 406 the core scheduling unit 110 (in particular the interrupt control 206) issues the corresponding interrupt (IRQ to the CPU 102 via interface 114 and APB 112). The receipt of this interrupt (which is handled by the non-secure driver 156) causes the CPU 102 to read the message which has been stored in the message buffer 176 (step 408). Then at step 410, either the non-secure driver itself amends the page tables as required to allocate more memory for a non-secure video decoding task, or the non-secure driver calls the secure driver 154 to amend the page tables as required to allocate more memory for a secure video decoding task. Once this is completed, the CPU 102 writes a confirmation message into the message buffer 176 (step 412) and then notifies the core scheduling unit 110 (step 414) that this has been done. Finally at step 416, the core scheduling unit 110 (in particular the job administration unit 204) signals to the corresponding video core that it can restart the video decoding task and can now make use of the additional memory allocated.

Figure 8:
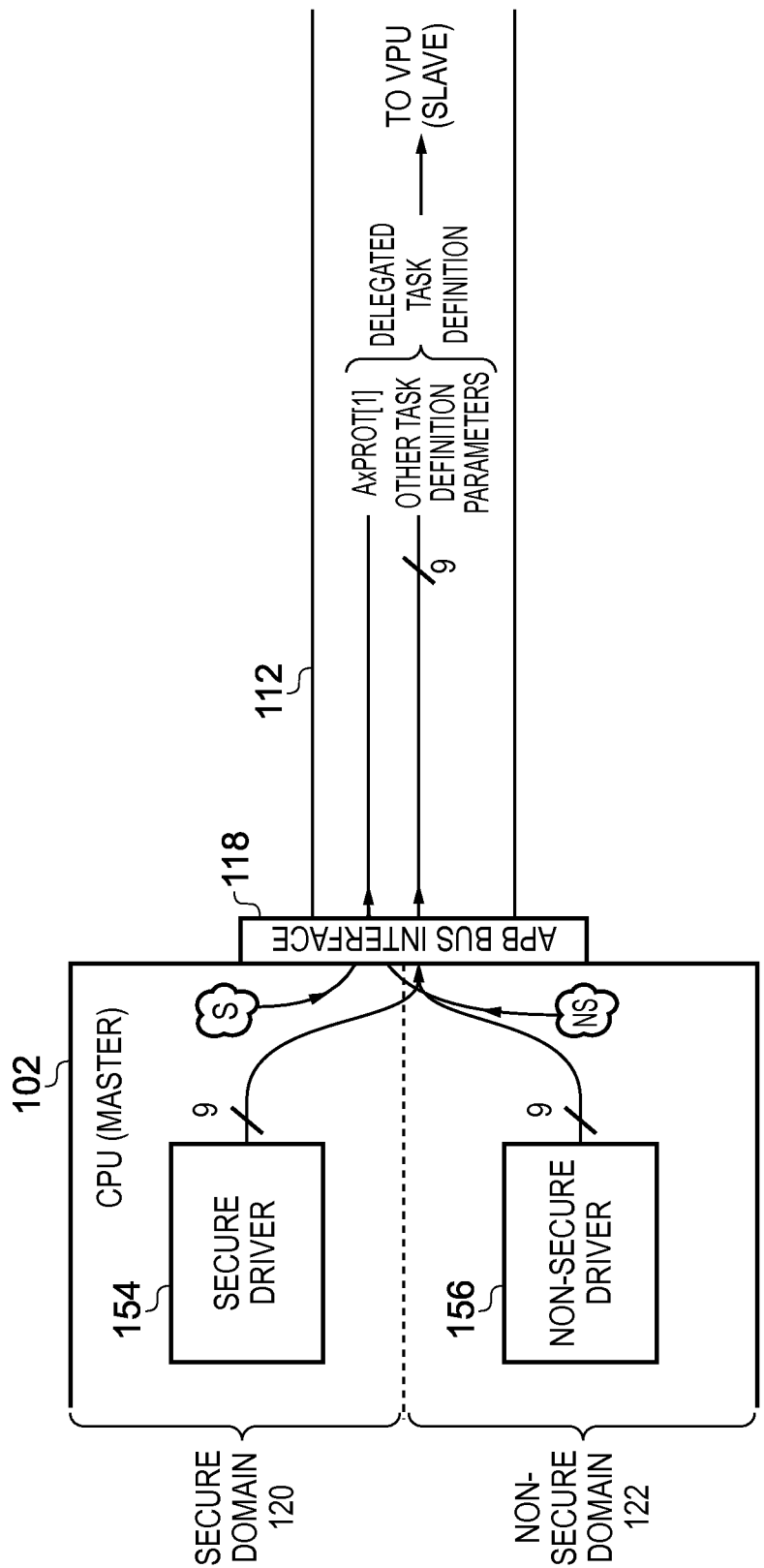
FIG. 8 schematically illustrates how a delegated task definition may be constructed and passed from a master CPU to a slave VPU in one embodiment.

FIG. 8 schematically illustrates in more detail how a delegated task definition is constructed and passed from a CPU to a VPU in one embodiment, such as that illustrated in FIG. 1. The delegated task definition which a driver in the CPU 102 wishes to write to the VPU (not illustrated in FIG. 8) is (in this example embodiment) composed of ten definition parameters. As illustrated in FIG. 8, nine of these task definition parameters are provided by the driver which issues the delegated task definition i.e. either secure driver 154 or non-secure driver 156. However, the APB interface 118 by which the CPU 102 is coupled to the APB 112 is configured such that one task definition parameter of the delegated task definition, namely AxPROT [1], does not come from the driver issuing the delegated task definition but is provided by the domain in which the driver is operating. Accordingly, when non-secure driver 156 writes a delegated task definition (i.e. by constructing the nine task definition parameters which it has the freedom to set) onto the APB 112 the AxPROT value is automatically set to one (i.e. NS=1), indicating that this delegated task definition has been issued by a component operating in the non-secure domain. Conversely, when the secure driver 154 writes its nine task definition parameters, the AxPROT value is automatically set to zero (i.e. NS=0), indicating that this delegated task definition has been issued by a component operating in the secure domain. The delegated task definition is then passed to the VPU. A delegated task definition received by the VPU is added to a task definition such as the memory space allocation table 200 illustrated in FIG. 2.

In addition to the page table base address and security bit, an LSIDENTRY has various other parameters as schematically illustrates in FIG. 9, which shows an example entry for a secure task. Once such a secure task is written into the task definition table, generally only a secure component operating in the secure domain 120 of the CPU 102 is allowed to amend these parameters, however as illustrated in FIG. 9, the IRQ and IRQACK parameters may also be amended by a non-secure component operating in the non-secure domain 122. As illustrated in FIG. 9, the LSIDENTRY parameters for a secure task which can only be amended by a secure component are #CORES (i.e. a value indicating the number of cores on which this task should be executed), MMUCTRL (the PTBA definition), the NS bit (defining the security status), FLUSH (by means of which a core can be caused to flush) and TERMINATE (by means of which an already executing job can be caused to prematurely terminate) are only amendable by a secure component. In the case of an LSIDENTRY for a non-secure task a non-secure secure component operating in the non-secure domain 122 is permitted access, with the usual provision that a non-secure secure component operating in the non-secure domain 122 cannot set the NS bit to NS=0 (secure status). The use and amendment of some of these parameters is described with reference to FIGS. 10 and 11.

Figure 10:
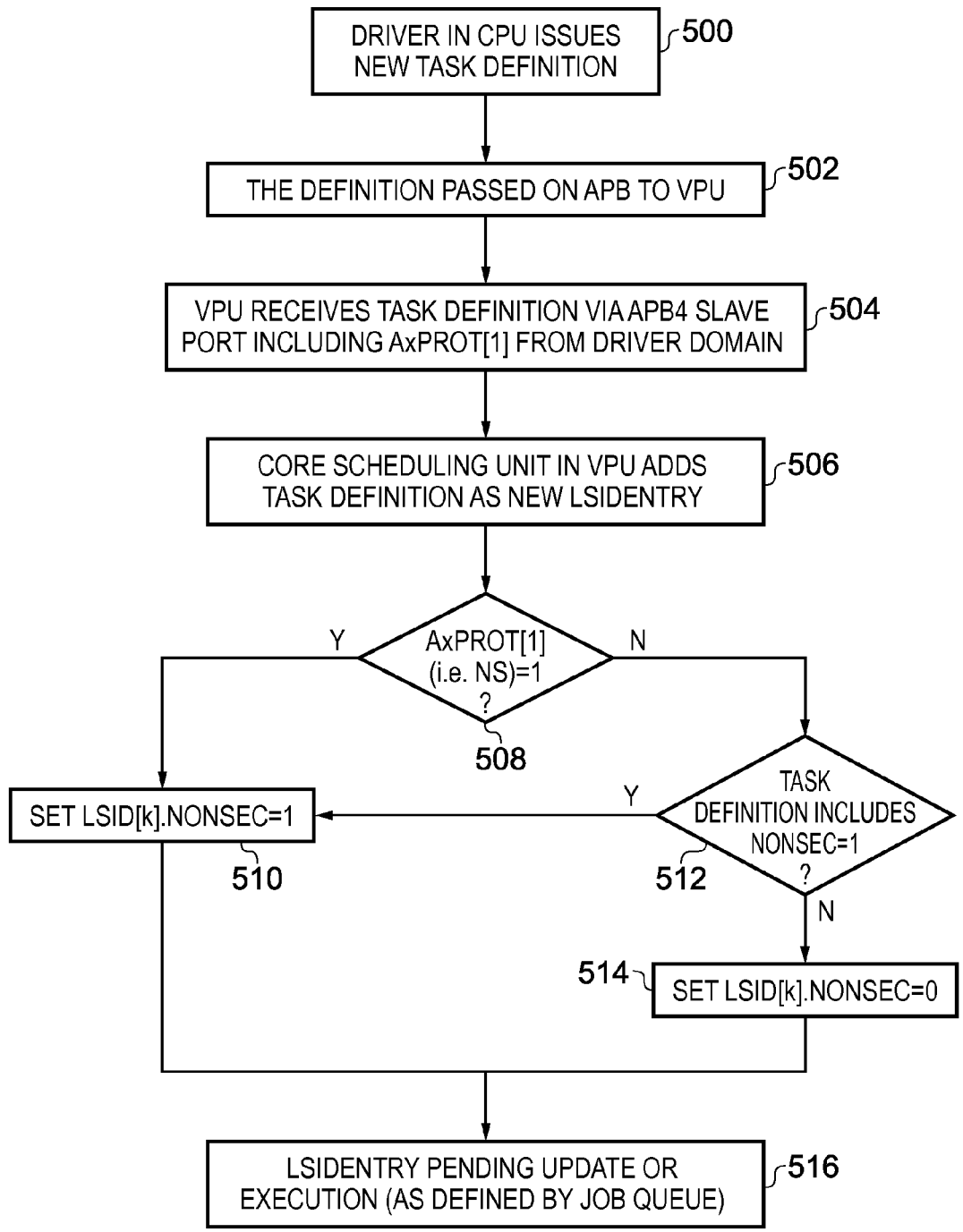
FIG. 10 schematically illustrates a series of steps which may be taken in a data processing apparatus in one embodiment in which a CPU delegates a video processing task to a VPU.

FIG. 10 illustrates a series of steps which may be taken in one embodiment, showing how the issuance of a new task definition from the CPU is handled. The flow begins at step 500 where a driver (either secure or non-secure) in the CPU 102 issues a new task definition. This task definition is passed via the APB 112 to the VPU 104 (step 502). Importantly, the task definition received by the VPU 104 via its APB 4 slave port (i.e. interface 114) includes the AxPROT[1] value which has come from the driver domain as described above. Next at step 506, the core scheduling unit 110 in the VPU 104 adds this task definition as a new LSIDENTRY entry (i.e. into the memory space allocation table 200). At step 508, the core scheduling unit determines whether the value of AxPROT [1] is one or not (i.e. whether this a secure or a non-secure originating task definition). If it is a non-secure originating task definition then the flow proceeds to step 510 where LSID[k].NONSEC is set to one (i.e. the $k^{th}$ entry in the set of LSIDENTRY values is set to 1 defining this is a non-secure task). Alternatively, if at step 508 it is determined that this is a secure domain originating task definition then the flow proceeds to step 512 at which it is determined whether the task definition includes an indication that the security of the task in the memory space allocation table 200 should be set as non-secure (i.e. if the task definition written by the issuing driver includes a parameter NONSEC=1). In other words, the task definition received from the CPU includes a security status request indicating the security status which the issuing component in the CPU wants the delegated task to have. As can be seen in FIG. 10, if the issuing component is within the non-secure domain then this information is never considered (i.e. an issuing component in the non-secure domain has no choice to set a task as secure). However, an issuing component in the secure domain does have the choice to set up a non-secure delegated task. Accordingly if the task definition includes this request for a non-secure status at step 512 then the flow proceeds to step 510 and the task is labelled as non-secure. Otherwise from step 512 the flow proceeds to step 514 where LSID[k].NONSEC is set to zero (i.e. the $k^{th}$ entry in the set of LSIDENTRY values is set to 0 defining this is a secure task). The final step of the flow chain in FIG. 10 is step 516 where this new LSIDENTRY is then waiting to be executed on one of the VPU cores 108 (or to be updated by a subsequent access from the CPU 102 before it is executed). Accordingly, it will be appreciated that the configuration of the core scheduling unit 110 to perform the steps 508, 510, 512 and 514 described above represents a security inheritance mechanism whereby a delegated data processing operation scheduled within the core scheduling unit 110 inherits the security status of the domain in which the issuing component setting up that delegated data processing operation is itself operating. Hence, an issuing component in the non-secure domain can only be set up a non-secure task. Additionally however, the security status request which can be included in the task definition received on the APB 112 allows, only in the case of an issuing component in the secure domain of the CPU 112, to override this security inheritance mechanism and to set up a non-secure task in the core scheduling unit 110.

Figure 11:
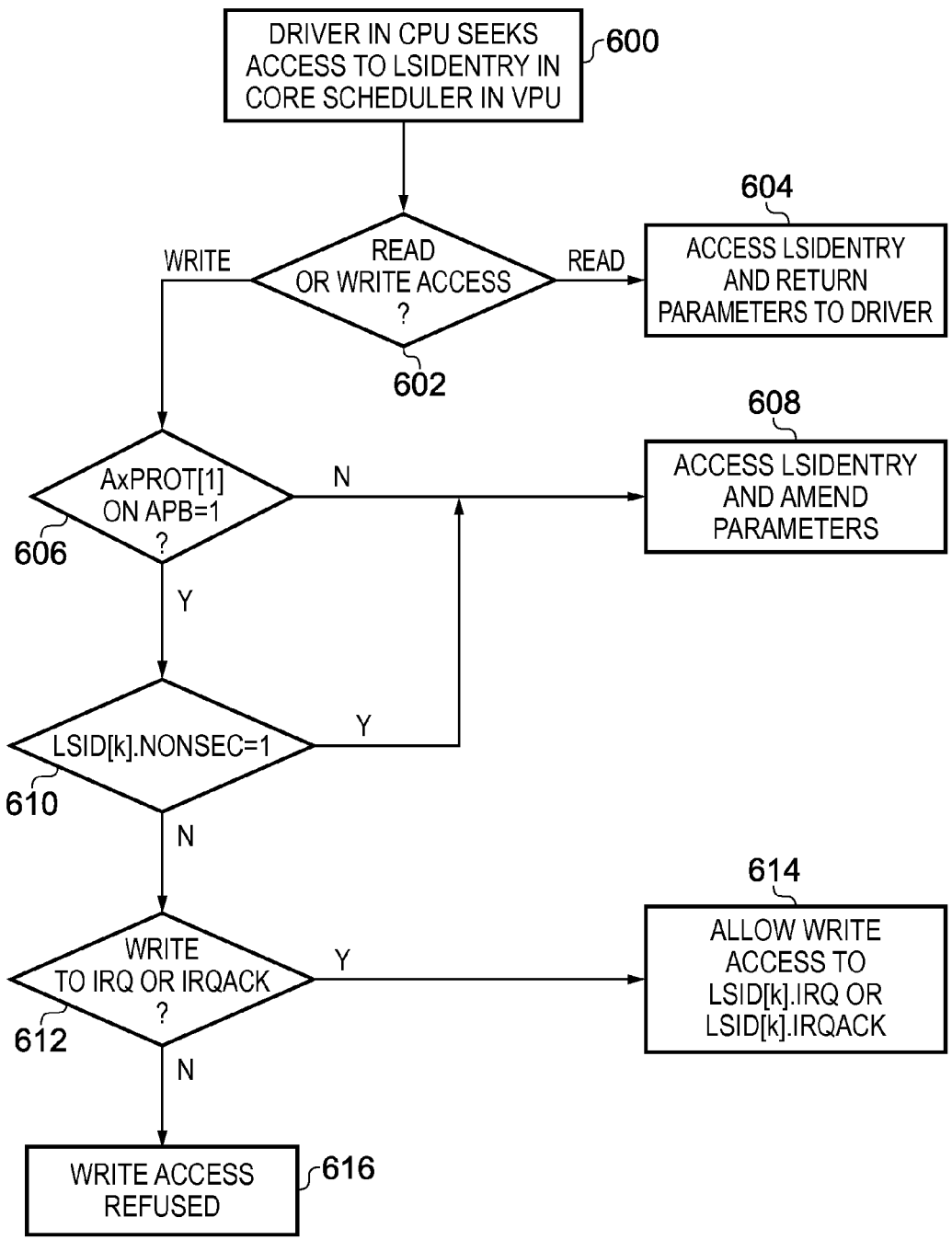
FIG. 11 schematically illustrates a series of steps which may be taken in one embodiment in which a driver in a CPU seeks access to a task definition stored in a scheduler in a VPU.

FIG. 11 illustrates a series of steps which may be taken in one embodiment, showing what happens when a driver in the CPU 102 seeks access to a parameter in a LSIDENTRY stored in the core scheduler of the VPU. Thus when such an access is sought (at step 600), the flow proceeds to step 602, where it is determined if the access is a read or a write request. Read access to LSIDENTRY parameters is freely allowed (step 604). If a write access is sought then the flow proceeds to step 606.

Here the AxPROT[1] value accompanying the access request on the APB 112 is examined and it is determined if the issuing component resides in the secure domain 120 of the CPU 102. If it does (i.e. AxPROT[1] is 0) then full write access to the LSIDENTRY is granted to this secure issuing component (e.g. secure driver 154) at step 608. If however AxPROT[1] is 1 (i.e. the request comes from a component such as non-secure driver 156 in the non-secure domain 122), then at step 610 it is determined what the security status is of the LSIDENTRY to which access is sought. If this LSIDENTRY is non-secure then the flow proceeds to step 608 and the write access is allowed. If on the other hand this LSIDENTRY is denoted as corresponding to a secure task, then only limited write access is permissible. Specifically, at step 612 it is determined if the write access is seeking to modify the IRQ or IRQACK parameters of this LSIDENTRY (by means of which a video core can signal a request for and acknowledge communication with the master CPU). Write access to these particular parameters is allowed (step 614), but all other write accesses are refused (step 616).

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
a primary processor;
a secondary processor configured to perform secure data processing operations and non-secure data processing operations; and
a memory configured to store secure data used by said secondary processor when performing said secure data processing operations and configured to store non-secure data used by said secondary processor when performing said non-secure data processing operations,
wherein said secure data cannot be accessed by said non-secure data processing operations,
wherein said secondary processor comprises a memory management unit configured to administer accesses to said memory from said secondary processor, said memory management unit configured to perform translations between virtual memory addresses used by said secondary processor and physical memory addresses used by said memory,
wherein said translations are configured in dependence on a page table base address, said page table base address identifying a storage location in said memory of a set of descriptors defining said translations,
wherein said page table base address is defined by said primary processor and cannot be amended by said secondary processor.

2. The data processing apparatus as claimed in claim 1, wherein said page table base address is stored in a page table base address register in said memory management unit.

3. The data processing apparatus as claimed in claim 1, wherein said primary processor is configured to perform secure data processing operations and non-secure data processing operations, wherein said secure data processing operations are performed in a secure domain of said primary processor and said non-secure data processing operations are performed in a non-secure domain of said primary processor.

4. The data processing apparatus as claimed in claim 3, wherein said page table base address and said set of descriptors are defined by a secure component executing in said secure domain of said primary processor.

5. The data processing apparatus as claimed in claim 4, wherein said secure component is a secure driver executing in said secure domain of said primary processor.

6. The data processing apparatus as claimed in claim 4, wherein said secure component is a secure kernel executing in said secure domain of said primary processor.

7. The data processing apparatus as claimed in claim 1, wherein said secure data processing operations and non-secure data processing operations in said secondary processor are dependent on data processing instructions stored at least partially in said memory.

8. The data processing apparatus as claimed claim 1, wherein said secondary processor comprises multiple processor cores.

9. The data processing apparatus as claimed in claim 8, wherein at least one processor core of said multiple processor cores is configured to execute multiple data processing operations concurrently, wherein said multiple data processing operations comprise at least one secure data processing operation and at least one non-secure data processing operation.

10. The data processing apparatus as claimed in claim 8, wherein each processor core of said multiple processor cores comprises a dedicated memory management unit configured to administer accesses to said memory from that processor core and each dedicated memory management unit is configured to store a specified page table base address associated with that dedicated memory management unit.

11. The data processing apparatus as claimed in claim 8, wherein at least two of said multiple processor cores are configured to perform at least two data processing operations which share said page table base address.

12. The data processing apparatus as claimed in claim 8, wherein said memory management unit is configured to administer accesses to said memory for each processor core of said multiple processor cores and stores a dedicated page table base address associated with each processor core.

13. The data processing apparatus as claimed in claim 8, wherein said memory management unit is configured to administer accesses to said memory for each processor core of said multiple processor cores and stores a dedicated page table base address associated with each data processing operation.

14. The data processing apparatus as claimed in claim 12, wherein each processor core has an associated local storage device configured to store copies of address translations recently performed by said memory management unit for that processor core.

15. The data processing apparatus as claimed in claim 8, wherein said secondary processor further comprises a bus interface via which said page table base address and said set of descriptors can be defined by said primary processor, wherein said multiple processor cores cannot write to said bus interface.

16. The data processing apparatus as claimed in claim 8, wherein said secondary processor further comprises a scheduling unit configured to allocate said secure data processing operations and said non-secure data processing operations as jobs between said multiple processor cores.

17. The data processing apparatus as claimed in claim 16, when dependent on claim 4, wherein said scheduling unit comprises a memory space allocation table, said memory space allocation table configured to store a set of entries each indicating a page table base address and a security status, wherein said scheduling unit is configured to allocate memory to said jobs executing on said multiple processor cores on the basis of said set of entries in said memory space allocation table, wherein only said secure component can write an entry in said set of entries with a secure security status.

18. The data processing apparatus as claimed in claim 16, wherein said scheduling unit comprises a job queue configured to determine an execution order of said jobs with reference to said set of entries in said memory space allocation table.

19. The data processing apparatus as claimed in claim 18, when dependent on claim 3, wherein a non-secure component executing in said non-secure domain of said primary processor can determine said execution order.

20. The data processing apparatus as claimed in any claim 1 wherein said secondary processor is a video processing unit configured to perform video coding operations.

21. The data processing apparatus as claimed in claim 17, wherein said video processing unit comprises multiple video cores, said multiple video cores configured to perform said video coding operations in parallel on multiple streams of video data.

22. The data processing apparatus as claimed in claim 17, wherein said video processing unit comprises multiple video cores, said multiple video cores configured to perform said video coding operations in parallel on a single stream of video data, wherein said multiple video cores share said page table base address.

23. The data processing apparatus as claimed in claim 1, wherein said secondary processor is a graphics processing unit configured to perform graphics processing operations.

24. A data processing apparatus comprising:
primary processor means;
secondary processor means for performing secure data processing operations and non-secure data processing operations; and
memory means for storing secure data used by said secondary processor means when performing said secure data processing operations and for storing non-secure data used by said secondary processor means when performing said non-secure data processing operations, wherein said secure data cannot be accessed by said non-secure data processing operations,
wherein said secondary processor means comprises memory management means for administering accesses to said memory from said secondary processor means, said memory management means for performing translations between virtual memory addresses used by said secondary processor means and physical memory addresses used by said memory means,
wherein said translations are configured in dependence on a page table base address, said page table base address identifying a storage location in said memory means of a set of descriptors defining said translations,
wherein said page table base address is defined by said primary processor means and cannot be amended by said secondary processor.

25. A method of data processing in a data processing apparatus comprising a primary processor and a secondary processor, the method comprising the steps of:
performing secure data processing operations and non-secure data processing operations in said secondary processor;
storing in a memory secure data used by said secondary processor when performing said secure data processing operations and storing non-secure data used by said secondary processor when performing said non-secure data processing operations, wherein said secure data cannot be accessed by said non-secure data processing operations;
administering accesses to said memory from said secondary processor in a memory management unit in said secondary processor by performing translations between virtual memory addresses used by said secondary processor and physical memory addresses used by said memory; and
configuring said translations in dependence on a page table base address, said page table base address identifying a storage location in said memory of a set of descriptors defining said translations,
wherein said page table base address is defined by said primary processor and cannot be amended by said secondary processor.

\* \* \* \* \*